United States Patent
Tsuchiya et al.

(10) Patent No.: US 9,873,071 B2
(45) Date of Patent: Jan. 23, 2018

(54) HONEYCOMB STRUCTURE AND MANUFACTURING METHOD OF HONEYCOMB STRUCTURE

(71) Applicant: NGK Insulators, Ltd., Nagoya (JP)

(72) Inventors: Yusuke Tsuchiya, Nagoya (JP); Hiroyuki Suenobu, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 428 days.

(21) Appl. No.: 14/618,253

(22) Filed: Feb. 10, 2015

(65) Prior Publication Data

US 2015/0151232 A1 Jun. 4, 2015

Related U.S. Application Data

(62) Division of application No. 13/847,105, filed on Mar. 19, 2013, now Pat. No. 9,084,954.

(30) Foreign Application Priority Data

Mar. 22, 2012 (JP) .................................. 2012-065682
Feb. 15, 2013 (JP) .................................. 2013-028465

(51) Int. Cl.
*B01D 39/14* (2006.01)
*B01D 39/20* (2006.01)
(Continued)

(52) U.S. Cl.
CPC ..... *B01D 46/0005* (2013.01); *B01D 46/0001* (2013.01); *B01D 46/244* (2013.01); *B01D 2279/30* (2013.01)

(58) Field of Classification Search
CPC .............. B01D 46/244; B01D 46/2459; C04B 38/0012
See application file for complete search history.

(56) References Cited

U.S. PATENT DOCUMENTS

2005/0221974 A1* 10/2005 Tomita .................. C04B 35/111
501/141
2006/0029768 A1* 2/2006 Furukawa .............. B01J 27/224
428/116
(Continued)

FOREIGN PATENT DOCUMENTS

EP 1 974 793 A1 10/2008
EP 1 997 599 A1 12/2008
(Continued)

OTHER PUBLICATIONS

European Office Action (Application No. 13160446.4) dated Apr. 7, 2016.
(Continued)

*Primary Examiner* — Amber R Orlando
(74) *Attorney, Agent, or Firm* — Burr & Brown, PLLC (57) ABSTRACT

The honeycomb structure includes a honeycomb structure part having porous partition walls, and porous plugged portions, and when there is drawn a straight line as an inner boundary line which is positioned at a distance of 30% of a distance between an outer end surface and an inner end surface, from the inner end surface, and there is drawn a straight line as an outer boundary line which is positioned at a distance of 70% of the distance between the outer end surface and the inner end surface, from the inner end surface, each of the plugged portions has an outer region, and an inner region which is the region between the inner end surface and the inner boundary line and whose porosity is larger than a porosity of the outer region.

2 Claims, 2 Drawing Sheets

(51) Int. Cl.
*B01D 39/06* (2006.01)
*B01D 50/00* (2006.01)
*B01D 46/00* (2006.01)
*B01D 46/24* (2006.01)

(56) References Cited

U.S. PATENT DOCUMENTS

| | | | |
|---|---|---|---|
| 2006/0029769 A1 | 2/2006 | Ichikawa et al. | |
| 2006/0062961 A1* | 3/2006 | Kaneda | C04B 38/0006 428/116 |
| 2006/0112669 A1* | 6/2006 | Yamada | B28B 11/006 55/523 |
| 2006/0150598 A1* | 7/2006 | Ichikawa | B01D 46/0001 55/523 |
| 2007/0039298 A1* | 2/2007 | Tokumaru | B01D 46/2418 55/523 |
| 2007/0044444 A1* | 3/2007 | Oshimi | B01D 46/2429 55/523 |
| 2007/0182072 A1* | 8/2007 | Ichikawa | B01D 46/0001 264/630 |
| 2007/0269634 A1* | 11/2007 | Suenobu | B01D 46/0001 428/116 |
| 2008/0197534 A1 | 8/2008 | Ichikawa | |
| 2008/0264010 A1* | 10/2008 | Mizuno | B01D 46/2429 55/350.1 |
| 2009/0011180 A1 | 1/2009 | Ichikawa | |
| 2009/0205303 A1 | 8/2009 | Ichikawa et al. | |
| 2009/0246458 A1 | 10/2009 | Yamada et al. | |
| 2010/0058725 A1 | 3/2010 | Konomi et al. | |
| 2010/0135866 A1* | 6/2010 | Mizuno | B01D 46/2425 422/180 |
| 2010/0242426 A1* | 9/2010 | Ohara | B01D 46/2429 55/523 |
| 2010/0247853 A1* | 9/2010 | Ichikawa | C04B 35/195 428/116 |
| 2010/0252497 A1* | 10/2010 | Ellison | C03C 8/02 210/500.1 |

FOREIGN PATENT DOCUMENTS

| | | |
|---|---|---|
| EP | 2 484 504 A1 | 8/2012 |
| JP | 2009-195805 A1 | 9/2009 |
| WO | 2004/052502 A1 | 6/2004 |
| WO | 2007/111175 A1 | 10/2007 |
| WO | 2008/115378 A1 | 9/2008 |
| WO | 2011/040145 A1 | 4/2011 |

OTHER PUBLICATIONS

Extended European Search Report (Application No. 13160446.4) dated May 26, 2015.

* cited by examiner

HONEYCOMB STRUCTURE AND MANUFACTURING METHOD OF HONEYCOMB STRUCTURE

CROSS-REFERENCE TO RELATED APPLICATIONS

The present application is a divisional of U.S. patent application Ser. No. 13/847,105, filed Mar. 19, 2013, and claims the benefit under 35 USC §119(a)-(d) of Japanese Patent Application No. 2012-065682 filed on Mar. 22, 2012 and Japanese Patent Application No. 2013-028465 filed on Feb. 15, 2013, the entire contents of which are incorporated herein by reference.

BACKGROUND OF THE INVENTION

Field of the Invention

The present invention relates to a honeycomb structure and a manufacturing method of the honeycomb structure, and more particularly, it relates to a honeycomb structure in which a stress is prevented from being concentrated on each end portion at canning and during use and hence cracks are not easily generated, and a manufacturing method of the honeycomb structure.

Description of Related Art

Heretofore, a honeycomb structure has been used as a collecting filter to remove a particulate matter (PM) discharged from a diesel engine or the like. As the honeycomb structure for use as the particulate matter collecting filter, there has been used a plugged honeycomb structure including plugged portions at predetermined positions in both end surfaces (see e.g., Patent Document 1).

Here, the plugged honeycomb structure includes a honeycomb structure part having porous partition walls with which a plurality of cells are formed to become through channels of a fluid, and plugged portions arranged in end portions of the predetermined cells on a fluid inlet side and end portions of the remaining cells on a fluid outlet side. These plugged portions are usually alternately arranged in the predetermined cells and the remaining cells so as to form a so-called checkered pattern. According to such a plugged honeycomb structure, when an exhaust gas flows into the cells through an end surface of the structure on the inlet side of the exhaust gas, the exhaust gas which has flowed into the cells passes through the partition walls. Moreover, when the exhaust gas passes through the partition walls, the PM contained in the exhaust gas is collected by the partition walls. Therefore, the exhaust gas which has passed through the partition walls is discharged as the purified gas.

PRIOR ART DOCUMENT

Patent Document

[Patent Document 1] JP-A-2009-195805

SUMMARY OF THE INVENTION

However, in the plugged honeycomb structure disclosed in Patent Document 1, a stress is concentrated on end portions of the structure sometimes at canning or during use. In consequence, there has been the problem that cracks are easily generated in the end portions. Moreover, when the cracks are generated in the end portions, part of each plugged portion is broken to drop down together with a partition wall which comes in contact with the plugged portion sometimes.

The present invention has been developed in view of such problems of the conventional technology, and an object thereof is to provide a honeycomb structure in which a stress is prevented from being concentrated on each end portion at canning and during use and hence cracks are not easily generated in the end portion, and a manufacturing method of the honeycomb structure.

According to the present invention, there are provided a honeycomb structure and a manufacturing method of the honeycomb structure as follows.

According to a first aspect of the present invention, a honeycomb structure including a honeycomb structure part having porous partition walls with which there are formed a plurality of cells extending through the honeycomb structure part from one end surface to the other end surface to become through channels of a fluid is provided; and porous plugged portions arranged in one end portion of each of the predetermined cells of the honeycomb structure part and the other end portion of each of the remaining cells, wherein when in a cross section of each of the plugged portions which is parallel to an extending direction of the cells of the honeycomb structure part, there is drawn an inner boundary line as the straight line which is positioned at a distance of 30% of a distance between an outer end surface and an inner end surface, from the inner end surface as the end surface on a side opposite to the outer end surface as the end surface on a side of the end surface of the honeycomb structure part, and which is perpendicular to the extending direction of the cells, and there is drawn an outer boundary line as the straight line which is positioned at a distance of 70% of the distance between the outer end surface and the inner end surface, from the inner end surface, and which is perpendicular to the extending direction of the cells, each of the plugged portions has an outer region which is the region between the outer end surface and the outer boundary line, and an inner region which is the region between the inner end surface and the inner boundary line and whose porosity is larger than a porosity of the outer region.

According to a second aspect of the present invention, the honeycomb structure according to the above first aspect is provided, wherein in each of the plugged portions, a porosity of a central region as the region between the outer region and the inner region is larger than the porosity of the outer region, and a porosity of the inner region is larger than the porosity of the central region.

According to a third aspect of the present invention, the honeycomb structure according to the above first or second aspects is provided, wherein the porosity of each of the plugged portions continuously increases from the outer end surface of the plugged portion toward the inner end surface thereof.

According to a fourth aspect of the present invention, the honeycomb structure according to any one of the above first to third aspects is provided, wherein a difference in porosity between the inner region of each of the plugged portions and the outer region thereof is from 2 to 55%.

According to a fifth aspect of the present invention, the honeycomb structure according to any one of the above first to fourth aspects is provided, wherein the porosity of the outer region of each of the plugged portions is from 29 to 80%, and the porosity of the inner region of the plugged portion is from 38 to 87%.

According to a sixth aspect of the present invention, the honeycomb structure according to any one of the above first to fifth aspects is provided, wherein a difference in porosity between the inner region of each of the plugged portions and each of the partition walls of the honeycomb structure part is from 2 to 50%.

According to a seventh aspect of the present invention, the honeycomb structure according to any one of the above first to sixth aspects is provided, wherein a porosity of each of the partition walls of the honeycomb structure part is from 30 to 80%.

According to an eighth aspect of the present invention, the honeycomb structure according to any one of the above first to seventh aspects is provided, wherein open area ratios of the cells in the one end surface and the other end surface of the honeycomb structure part are from 30 to 90%, respectively.

According to a ninth aspect, of the present invention, a manufacturing method of a honeycomb structure including a formed honeycomb body preparing step of extruding, into a honeycomb shape, a kneaded material obtained by kneading a forming raw material containing a ceramic raw material is provided, to prepare a formed honeycomb body having partition walls with which there are formed a plurality of cells extending through the formed honeycomb body from one end surface to the other end surface; a plugged formed honeycomb body preparing step of continuously rubbing, into open frontal areas of the cells of the prepared formed honeycomb body, a plugging material including the forming raw material containing the ceramic raw material and 1.5 to 35 mass % of resin balloons, to fill the plugging material into the open frontal areas, thereby preparing the plugged formed honeycomb body; and a honeycomb structure preparing step of firing the prepared plugged formed honeycomb body, to prepare the honeycomb structure in which porous plugged portions are arranged in one end portion of each of the predetermined cells and the other end portion of each of the remaining cells.

According to a tenth aspect of the present invention, the manufacturing method of the honeycomb structure according to the above ninth aspect is provided, wherein a viscosity of the plugging material is from 30 to 2000 dPa·s.

In a honeycomb structure of the present invention, each of plugged portions has "an outer region which is the region between an outer end surface and an outer boundary line, and an inner region whose porosity is larger than a porosity of the outer region". That is, a difference in porosity is made in the plugged portion. Therefore, a suitably strong stress is easily generated in a boundary between the plugged portion and each of partition walls of a honeycomb structure part. Furthermore, a suitably strong stress is also generated in the plugged portion. In consequence, as compared with a case where the porosity is constant in the plugged portion, it is possible to prevent the stress from being concentrated on the boundary between the plugged portion and the partition wall of the honeycomb structure part. Therefore, cracks are not easily generated in each end portion of the honeycomb structure of the present invention at canning and during use. "The suitably strong stress is generated" means that although the stress is generated not only in the plugged portions but also in the partition walls, the generated stress is not so strong as to damage the plugged portions and the like (as to generate the cracks). That is, in a conventional honeycomb structure, the stress has been concentrated on the boundary between the plugged portion and the partition wall of the honeycomb structure part. However, in the honeycomb structure of the present invention, the generated stress is dispersed. Therefore, even when the stress is generated between the plugged portion and the partition wall of the honeycomb structure part, the stress does not become so strong as to damage the plugged portions and the like.

A manufacturing method of the honeycomb structure of the present invention has a plugged formed honeycomb body preparing step. The plugged formed honeycomb body preparing step is the step of "continuously rubbing, into open frontal areas of the cells of the formed honeycomb body, a plugging material including the forming raw material containing the ceramic raw material and 1.5 to 35 mass % of resin balloons, to fill the plugging material into the open frontal areas, thereby preparing the plugged formed honeycomb body". Since the manufacturing method has the plugged formed honeycomb body preparing step, in the manufactured honeycomb structure, each of the plugged portions has "the outer region which is the region between the outer end surface and the outer boundary line, and the inner region whose porosity is larger than the porosity of the outer region". Therefore, according to the manufacturing method of the honeycomb structure of the present invention, it is possible to suitably manufacture the honeycomb structure in which the cracks are not easily generated in each end portion at the canning and during the use.

DETAILED DESCRIPTION OF THE INVENTION

Hereinafter, embodiments of the present invention will be described. It should be understood that the present invention is not limited to the following embodiments and that modifications, improvements and the like suitably added to the following embodiments based on the ordinary knowledge of a person skilled in the art without departing from the scope of the present invention are also included in the scope of the present invention.

Figure 1:
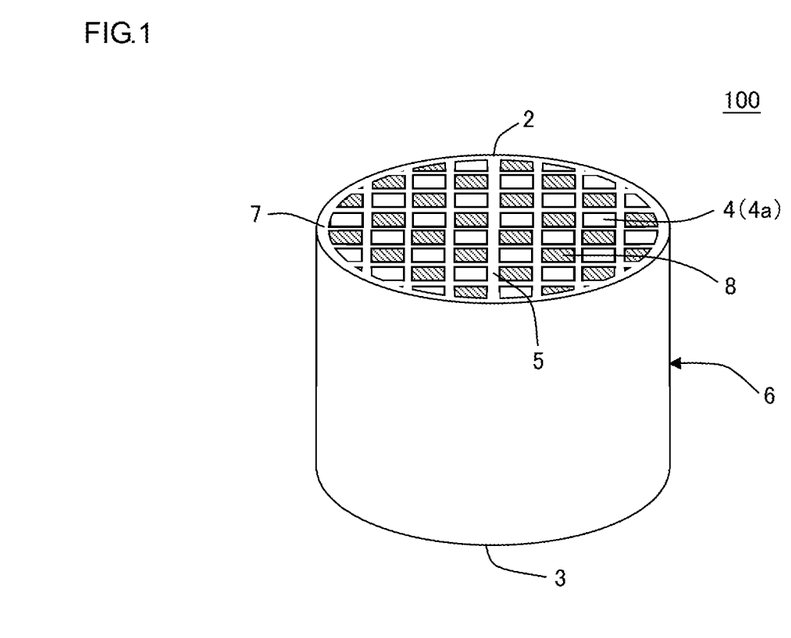
FIG. 1 is a perspective view schematically showing one embodiment of a honeycomb structure of the present invention.
Figure 2:
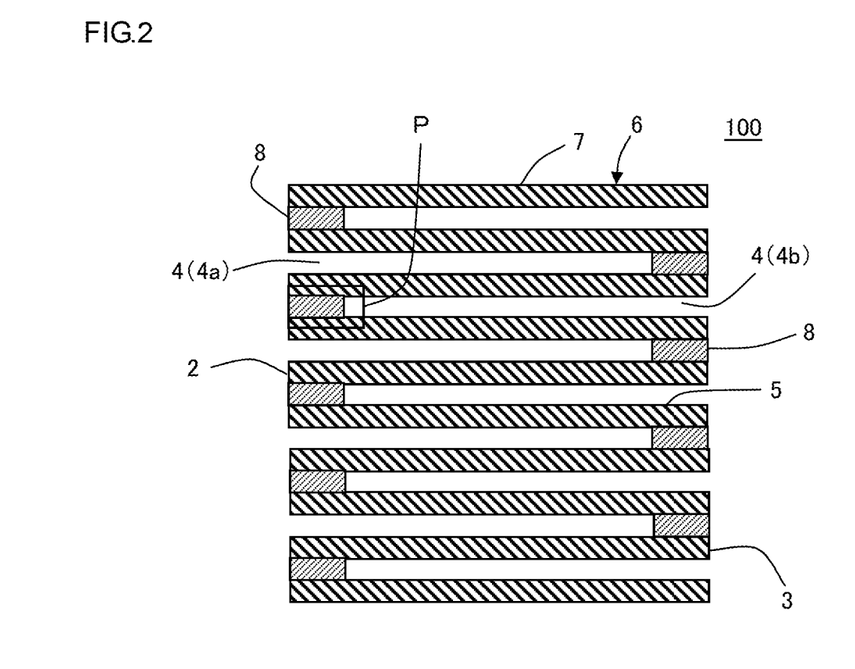
FIG. 2 is a cross-sectional view schematically showing a cross section of the honeycomb structure shown in FIG. 1 which is parallel to an extending direction of cells.
Figure 3:
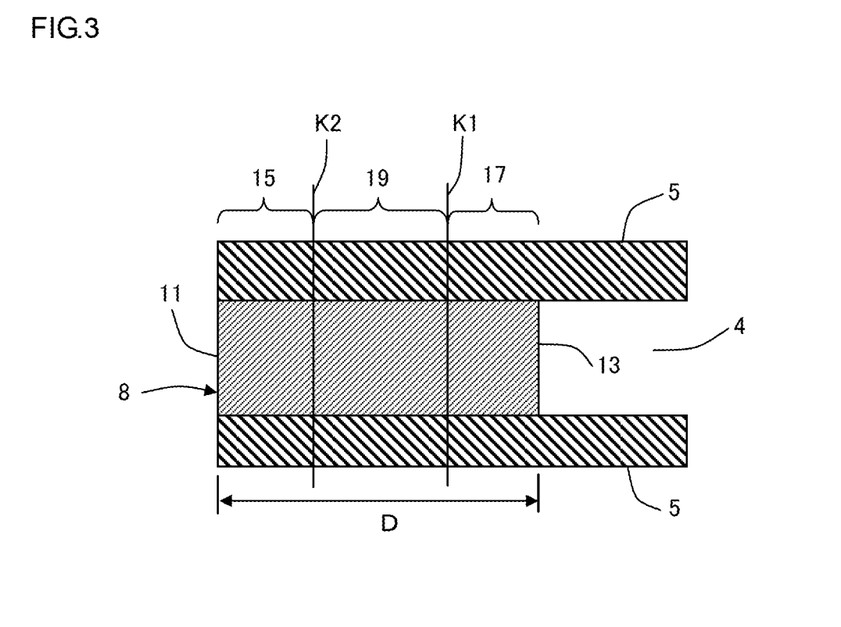
FIG. 3 is a cross-sectional view schematically showing an partial enlarged portion of a region P of FIG. 2.

[1] Honeycomb Structure:

One embodiment of a honeycomb structure of the present invention includes, as in a honeycomb structure 100 shown in FIG. 1 to FIG. 3, a honeycomb structure part 6 having porous partition walls 5 and porous plugged portions 8. With the partition walls 5, there are formed a plurality of cells 4 extending through the honeycomb structure part from one end surface 2 to the other end surface 3 to become through channels of a fluid. The plugged portions 8 are arranged in one end portion of each of the predetermined cells 4 (4*a*) of the honeycomb structure part 6 and the other end portion of each of the remaining cells 4 (4*b*). Here, in each of the plugged portions 8, a straight line which is positioned at a distance of 30% of a distance D between an outer end surface 11 and the inner end surface 13 from an inner end surface 13 and which is perpendicular to an extending direction of the cells 4 is an inner boundary line K1.

Moreover, a straight line which is positioned at a distance of 70% of the distance between the outer end surface 11 and the inner end surface 13 from the inner end surface 13 and which is perpendicular to the extending direction of the cells 4 is an outer boundary line K2. The outer end surface 11 is "the end surface on the side of the end surface (the closer end surface) of the honeycomb structure part 6" in the plugged portion 8. The inner end surface 13 is "the end surface on a side opposite to the outer end surface 11" in the plugged portion 8. Moreover, in the honeycomb structure 100, when the inner boundary line K1 and the outer boundary line K2 are drawn in a cross section of the honeycomb structure part 6 which is parallel to the extending direction of the cells 4, each of the plugged portions 8 has an outer region 15 which is the region between the outer end surface 11 and the outer boundary line K2. Furthermore, in the honeycomb structure 100, the plugged portion 8 has an inner region 17 which is the region between the inner end surface 13 and the inner boundary line K1 and whose porosity is larger than a porosity of the outer region 15. The plugged portions 8 are arranged alternately in the predetermined cells 4 (4*a*) and the remaining cells 4 (4*b*) so as to form a so-called checkered pattern. The honeycomb structure part 6 further has an outer peripheral wall 7 disposed in an outer periphery. Additionally, the honeycomb structure of the present invention does not need to necessarily have the outer peripheral wall 7.

In the honeycomb structure 100, each of the plugged portions 8 has "the outer region 15 which is the region between the outer end surface 11 and the outer boundary line K2 and the inner region 17 whose porosity is larger than the porosity of the outer region 15". That is, a difference in porosity is made in the plugged portion 8. Therefore, a suitably strong stress is easily generated in a boundary between the plugged portion 8 and each of the partition walls 5 of the honeycomb structure part 6. Furthermore, the suitably strong stress is also generated in the plugged portion 8. In consequence, as compared with the porosity is constant, the stress can be prevented from being concentrated on the boundary between the plugged portion 8 and the partition wall 5 of the honeycomb structure part 6. Consequently, in the honeycomb structure 100, cracks are not easily generated in each end portion at canning and during use.

FIG. 1 is a perspective view schematically showing one embodiment of the honeycomb structure of the present invention. FIG. 2 is a cross-sectional view schematically showing a cross section of the honeycomb structure shown in FIG. 1 which is parallel to an extending direction of cells. FIG. 3 is a cross-sectional view schematically showing a partial enlarged portion of a region P of FIG. 2.

[1-1] Honeycomb Structure Part:

Porosities of the partition walls 5 are preferably from 30 to 80%, further preferably from 35 to 75%, and especially preferably from 40 to 70%. When the porosities of the partition walls 5 are in the above range, a pressure loss can be decreased, and additionally a mechanical strength of the structure can be retained.

The porosities of the partition walls 5 are values measured by image analysis. Specifically, a plurality of view fields of the partition walls of the honeycomb structure in the cross section parallel to the cell extending direction are arbitrarily photographed by a scanning type electron microscope (SEM). Next, binarization of each photographed image is performed by the image analysis, and the image is divided into hollow portions (i.e., the pore portions) and portions other than hollows. Next, ratios of the hollow portions in the respective images are calculated, and then an average value of the ratios is obtained. In this way, the porosities of the partition walls are calculated.

Thicknesses of the partition walls 5 are preferably from 0.05 to 1.25 mm, further preferably from 0.075 to 1.00 mm, and especially preferably from 0.10 to 0.75 mm. When the thicknesses of the partition walls 5 are smaller than 0.05 mm, the mechanical strength of the structure might run short. When the thicknesses are in excess of 1.25 mm, the pressure loss tends to increase. The thicknesses of the partition walls 5 are values measured by a method of observing a cross section parallel to a central axis with a microscope.

An average pore diameter of the partition walls 5 is preferably from 3 to 50 µm, further preferably from 5 to 40 µm, and especially preferably from 7 to 30 µm. When the average pore diameter of the partition walls 5 is smaller than 3 µm, the pressure loss tends to increase. When the average pore diameter is in excess of 50 µm, a collecting efficiency tends to decrease. The average pore diameter of the partition walls 5 is a value measured with a mercury porosimeter.

A cell density of the honeycomb structure part 6 is preferably from 7.75 to 93.00 cells/cm$^2$, further preferably from 15.50 to 77.50 cells/cm$^2$, and especially preferably from 23.25 to 62.00 cells/cm$^2$. When the cell density of the honeycomb structure part 6 is smaller than 7.75 cells/cm$^2$, there is a tendency that a contact area between an exhaust gas and the honeycomb structure part 6 cannot sufficiently be obtained. When the cell density is in excess of 93.00 cells/cm$^2$, the pressure loss tends to increase. The cell density is the number of the cells per unit area in a cross section which is orthogonal to the extending direction of the cells.

A shape of each of the cells 4 is a quadrangular shape in the cross section orthogonal to the cell extending direction. There is not any special restriction on the shape of the cell 4, and besides the quadrangular shape, the shape can be, for example, a polygonal shape such as a triangular shape or an octagonal shape, a circular shape, or an elliptic shape.

An open area ratio of the cells is preferably from 30 to 90%, further preferably from 40 to 90%, and especially preferably from 50 to 90%. When the open area ratio of the cells is smaller than 30%, the pressure loss tends to increase. When the open area ratio is in excess of 90%, there is a tendency that a strength of the honeycomb structure part 6 cannot sufficiently be obtained. The open area ratio of the cells is the open area ratio of the cells in each of the one end surface and the other end surface of the honeycomb structure part. Additionally, the open area ratio of the cells in the one end surface may be the same as or different from the open area ratio of the cells in the other end surface.

There is not any special restriction on a thickness of the outer peripheral wall 7. The thickness of the outer peripheral wall 7 is preferably from 0.025 to 0.500 mm, further preferably from 0.050 to 0.475 mm, and especially preferably from 0.075 to 0.450 mm. When the thickness of the outer peripheral wall 7 is 0.025 mm or more, the mechanical strength of the outer peripheral wall 7 can be retained. Additionally, when the thickness is in excess of 0.500 mm, the pressure loss tends to increase.

There is not any special restriction on a shape of the honeycomb structure part 6. The shape of the honeycomb structure part 6 is preferably a cylindrical shape, a tubular shape in which a bottom surface is elliptic, or a tubular shape in which a bottom surface is polygonal, for example, quadrangular, pentangular or hexagonal, and the shape is further preferably the cylindrical shape. Moreover, there is not any special restriction on a size (a length or the like) of the honeycomb structure part 6 (the honeycomb structure 100). The length of the honeycomb structure part 6 in the cell extending direction is preferably from 50 to 500 mm. When an outer shape of the honeycomb structure part 6 (the honeycomb structure 100) is cylindrical, a diameter of the bottom surface is preferably from 50 to 800 mm.

The partition walls 5 and the outer peripheral wall 7 preferably contain a ceramic material as a main component. A material of the partition walls 5 and the outer peripheral wall 7 is preferably, for example, at least one selected from the following group. That is, the material is preferably at least one selected from the group consisting of silicon carbide, a silicon-silicon carbide composite material, cordierite, mullite, alumina, spinel, a silicon carbide-cordierite composite material, lithium aluminum silicate, and aluminum titanate. Among these materials, cordierite is preferable. When the material is cordierite, it is possible to obtain the honeycomb structure having a small coefficient of thermal expansion and an excellent resistance to heat shock. The material of the partition walls 5 is preferably the same as that of the outer peripheral wall 7. Additionally, the material of the partition walls 5 may be different from that of the outer peripheral wall 7. When "the walls contain the ceramic material as the main component", it is meant that 90 mass % or more of the ceramic material is contained in the whole material.

[1-2] Plugged Portion:

The plugged portions 8 are porous, and hence a plurality of pores are formed in the plugged portions 8. In the honeycomb structure of the present invention, an end portion (the inner end portion) of each of the plugged portions 8 on a central side of the honeycomb structure 100 has a higher porosity than an end portion (the outer end portion) of the plugged portion 8 on the side of the end surface of the honeycomb structure 100 (the end surface closer to the corresponding plugged portion 8). When the porosities of the inner end portion and outer end portion of each plugged portion are adjusted, the stress can be prevented from being concentrated on the boundary between the plugged portion 8 and the partition wall 5 of the honeycomb structure part 6.

Figure 4:
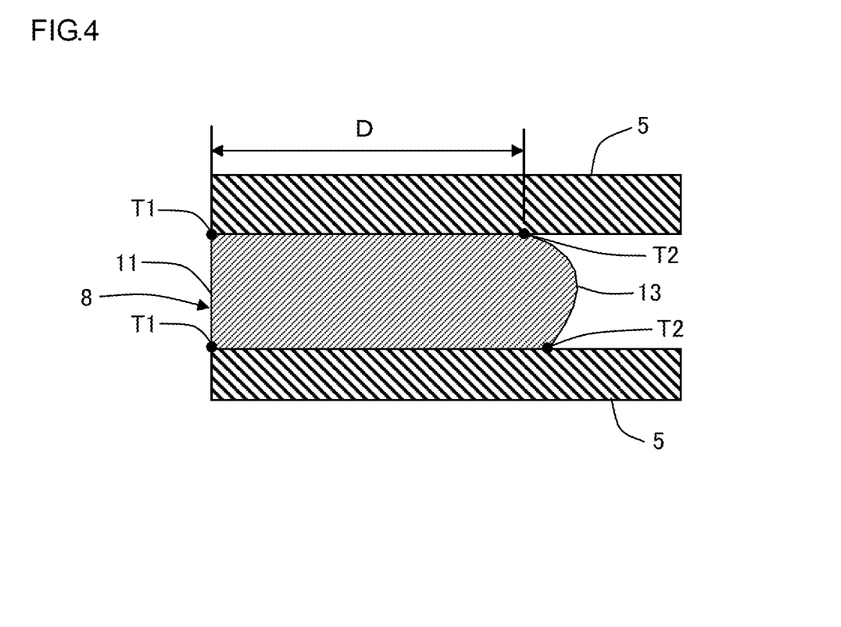
FIG. 4 is a cross-sectional view schematically showing a partial enlarged portion of a cross section parallel to an extending direction of cells in another embodiment of the honeycomb structure of the present invention.

The above "distance D between the outer end surface 11 and the inner end surface 13" is the distance between the outer end surface 11 and the inner end surface 13 in a direction parallel to the extending direction of the cells 4. Additionally, when "the distance D between the outer end surface 11 and the inner end surface 13" cannot be judged in the cross section parallel to the extending direction of the cells 4, the distance D is the shorter one of a distance between an end point T1 of the outer end surface 11 and an end point T2 of the inner end surface 13 and a distance between the other end point T1 and the other end point T2 (lengths of two lines segments) (see FIG. 4). FIG. 4 shows a case where the inner end surface 13 is curved and hence the distance D cannot be judged in the cross section parallel to the extending direction of the cells 4. Additionally, when the distance between the end point T1 of the outer end surface 11 and the end point T2 of the inner end surface 13 is the same as the distance between the other end points (the lengths of the two line segments are the same), each of the distances is the distance D. The end point T1 of the outer end surface 11 is an intersection between the outer end surface 11 and the surface of the partition wall 5 as shown in FIG. 4. Moreover, the end point T2 of the inner end surface 13 is an intersection between the inner end surface 13 and the surface of the partition wall 5 as shown in FIG. 4. FIG. 4 is a cross-sectional view schematically showing an enlarged part of a cross section parallel to an extending direction of cells in another embodiment of the honeycomb structure of the present invention.

Porosities of the respective regions (the outer region 15, a central region 19 and the inner region 17) of each of the plugged portions 8 are values measured by image analysis. Specifically, a plurality of view fields of the plugged portions in the cross section parallel to the cell extending direction are photographed by the scanning type electron microscope (SEM). Additionally, the view fields to be photographed are selected from both end portions and a central portion of each region in the cell extending direction. Next, the binarization of each photographed image is performed by the image analysis, and the image is divided into the hollow portions (i.e., the pore portions) and the portions other than the hollows. Next, ratios of the hollow portions in the respective images are calculated, and then an average value of the ratios is obtained. In this way, the porosities of the respective regions of the plugged portion are calculated.

The porosity of the outer region 15 of each of the plugged portions 8 is preferably from 29 to 80%, further preferably from 34 to 77%, and especially preferably from 39 to 75%. When the porosity of the outer region 15 is in the above range, the porosity becomes lower than that of the inner region 17, and hence the stress applied to the plugged portions 8 can suitably be dispersed. When the porosity of the outer region 15 is smaller than 29%, the stress applied to the plugged portions 8 is not easily dispersed. When the porosity is in excess of 80%, the strength of the plugged portions 8 tends to become excessively low. Therefore, during the use, the plugged portions might fall out of the honeycomb structure.

The porosity of the central region 19 of each of the plugged portions 8 is preferably from 29 to 87%, further preferably from 34 to 85%, and especially preferably from 39 to 83%. When the porosity of the central region 19 is smaller than 29%, the stress applied to the plugged portions 8 is not easily dispersed. When the porosity is in excess of 87%, the strength of the plugged portions 8 tends to become excessively low. Therefore, during the use, the plugged portions might fall out of the honeycomb structure.

The porosity of the inner region 17 of each of the plugged portions 8 is preferably from 38 to 87%, further preferably from 43 to 85%, and especially preferably from 48 to 83%. When the porosity of the inner region 17 is in the above range, the stress concentrated on the plugged portion 8 can suitably be alleviated. When the porosity of the inner region 17 is smaller than 38%, the stresses of the partition walls and the plugged portions on which the stress is most concentrated might not sufficiently be alleviated. When the porosity is in excess of 87%, the strength of the plugged portion 8 tends to become excessively low. Therefore, during the use, the plugged portions might fall out of the honeycomb structure.

A difference in porosity between the inner region 17 and the outer region 15 of each of the plugged portions 8 is preferably from 2 to 55%, further preferably from 3 to 50%, and especially preferably from 4 to 45%. When the above difference in porosity is in the above range, the stress concentrated on the plugged portion 8 can suitably be alleviated. When the difference in porosity is smaller than 2%, the stress applied to the plugged portions 8 might not sufficiently be dispersed. Moreover, when the difference in porosity is in excess of 55%, the suitably strong stress is not easily generated in the plugged portion 8. Therefore, the stress is not sufficiently dispersed, and the stress might be concentrated on a boundary between each of the partition walls 5 and each of the plugged portions 8.

A difference in porosity between each of the partition walls 5 of the honeycomb structure part 6 and the inner region 17 of each of the plugged portions 8 is preferably from 2 to 50%, further preferably from 3 to 45%, and especially preferably from 4 to 40%. When the above difference in porosity is in the above range, the stress concentrated on the boundary between the plugged portion 8 and the partition wall 5 can sufficiently be alleviated. When the difference in porosity is smaller than 2%, the stress applied to the plugged portions 8 might not sufficiently be dispersed. Moreover, when the difference in porosity is in excess of 50%, the difference in thermal conductivity of each of the partition walls 5 and each of the plugging portions 8 becomes too large, and hence the difference in volume expansion of them becomes excessively large due to heat. Thus, resistance to heat shock might decrease.

The porosity of the central region 19 (see FIG. 3) of each of the plugged portions 8 which is the region between the outer region 15 and the inner region 17 is preferably larger than the porosity of the outer region 15, and the porosity of the inner region 17 is preferably larger than the porosity of the central region 19. That is, in the plugged portion 8, it is preferable to satisfy a relation of "the porosity of the outer region 15"<"the porosity of the central region 19"<"the porosity of the inner region 17". When such a relation is satisfied, the suitably strong stress is suitably generated in the plugged portion 8. Therefore, the stress applied to the plugged portions 8 is further dispersed. In consequence, the stress concentrated on the plugged portions 8 can further be alleviated.

The porosity of each of the plugged portions 8 preferably continuously increases from the outer end surface 11 toward the inner end surface 13. In this way, the porosity of the plugged portion 8 continuously increases from the outer end surface 11 toward the inner end surface 13, and hence the cracks are not further easily generated at the canning and during the use. That is, it is possible to suitably prevent the generation of the cracks at the canning and during the use. "The porosity continuously increases from the outer end surface 11 toward the inner end surface 13" means that "the porosity of each divided region" calculated as follows successively increases from the outer end surface 11 to the inner end surface 13.

The above "porosity of each divided region" is a value calculated as follows. First, in the cross section parallel to the cell extending direction, each of the plugged portions is divided into a plurality of regions (the divided regions) in the cell extending direction from the outer end surface to the inner end surface. Next, at least one view field of each of the divided regions is photographed by the scanning type electron microscope (SEM). Next, the binarization of each photographed image is performed by the image analysis, and the image is divided into the hollow portions (i.e., the pore portions) and the portions other than the hollows. Next, the ratio of the hollow portions in the image of each divided region is calculated. When a plurality of view fields in each divided region are photographed, an average value is calculated. In this way, the porosity of each divided region is calculated.

An average pore diameter of the plugged portions 8 is preferably from 4 to 70 μm, further preferably from 7 to 60 μm, and especially preferably from 10 to 50 μm. When the above average pore diameter is in the above range, the increase of the pressure loss can be suppressed, and the collecting efficiency can be maintained. When the average pore diameter of the plugged portions 8 is smaller than 4 μm, the pressure loss tends to increase. When the average pore diameter is in excess of 70 μm, the collecting efficiency tends to decrease. The average pore diameter of the plugged portions 8 is a value measured as follows. First, the plugging material is not rubbed into the honeycomb structure part, but is poured into a stainless steel molding die having a diameter of 60 mm and a length of 15 mm. Afterward, the plugging material poured in this molding die is dried and fired as it is to obtain a bulk body. The obtained bulk material is measured with a porosimeter. The plugging material includes a forming raw material containing a ceramic raw material and 1.5 to 35 mass % of resin balloons.

A depth of each of the plugged portions 8 is preferably from 1 to 25 mm, and further preferably from 2 to 20 mm. Here, the depth of the plugged portion 8 means a length of the plugged portion 8 in the extending direction of the cells 4. A material of the plugged portions 8 is preferably the same as a material of the partition walls 5.

[2] Manufacturing Method of Honeycomb Structure of the Present Invention:

One embodiment of a manufacturing method of the honeycomb structure of the present invention has a formed honeycomb body preparing step of extruding, into a honeycomb shape, a kneaded material obtained by kneading a forming raw material containing a ceramic raw material, to prepare a formed honeycomb body. The manufacturing method of the honeycomb structure of the present embodiment has a plugged formed honeycomb body preparing step of "continuously rubbing", into open frontal areas of the cells of the formed honeycomb body, a plugging material including the forming raw material and 1.5 to 35 mass % of resin balloons, to fill the plugging material into the open frontal areas, thereby preparing the plugged formed honeycomb body. The forming raw material contains the ceramic raw material. The manufacturing method of the honeycomb structure of the present embodiment has a honeycomb structure preparing step of firing the prepared plugged formed honeycomb body, to prepare the honeycomb structure in which porous plugged portions are arranged in one end portion of each of the predetermined cells and the other end portion of each of the remaining cells. "Continuously rubbing the plugging material into the open frontal areas of the cells" means that without adding any new plugging materials, one type of plugging material (containing a pore former having predetermined particle diameters) beforehand prepared as much as a required amount (the amount required to obtain the desirable plugged portions) is rubbed into the open frontal areas of the cells. Therefore, the beforehand prepared one type of plugging material may be divided into a plurality of lumps to successively rub the respective lumps into the open frontal areas of the cells, or the beforehand prepared plugging material may be rubbed into the open frontal areas of the cells at a time.

The manufacturing method of such a honeycomb structure has "the plugged formed honeycomb body preparing step of continuously rubbing the above plugging material into the open frontal areas of the cells of the formed honeycomb body, to fill the plugging material into the open frontal areas, thereby preparing the plugged formed honeycomb body". Therefore, in the manufactured honeycomb structure, each of the plugged portions has "the outer region which is the region between the outer end surface and the outer boundary line, and the inner region whose porosity is larger than the porosity of the outer region". In consequence, according to the manufacturing method of the honeycomb structure of the present invention, it is possible to suitably manufacture the honeycomb structure in which the cracks are not easily generated at the canning and during the use.

Here, each of the plugged portions having "the outer region which is the region between the outer end surface and the outer boundary line, and the inner region whose porosity is larger than the porosity of the outer region" can be formed, for example, as follows. First, there are prepared a plurality of plugging materials in which particle diameters of pore formers are different, respectively. Next, to form the above plugged portions, the plugging materials are successively changed to fill the plugging materials into the cells. Specifically, a plugging material B including a pore former having large particle diameters is filled into a portion corresponding to the inner region, and a plugging material A including a pore former having particle diameters smaller than the particle diameters of the pore former of the plugging material B is filled into a portion corresponding to the outer region. Afterward, the plugging materials filled into the regions are fired. In consequence, the plugged portions can be formed. However, such a method requires a burdensome operation of preparing the plurality of plugging materials. It is necessary to change the plugging material for filling with respect to each predetermined region, which is troublesome. Furthermore, a boundary of the porosity is present in every layer (every region) formed of each plugging material, and hence the stress is easily concentrated on this boundary. Therefore, the cracks might be generated in each boundary between the respective layers. On the other hand, in the manufacturing method of the honeycomb structure of the present invention, the plugging material including 1.5 to 35 mass % of resin balloons is used, and this plugging material is continuously rubbed. Since the plugging material is continuously rubbed in this manner, these resin balloons are crushed by a resistance force received from the partition walls, and a total volume of the resin balloons decreases, as the plugging material is filled into the cells. Therefore, a larger amount of the crushed resin balloons (the resin balloons each having the small volume) in the plugging material filled into each of the cells are present in the region on the side of the end surface of the formed honeycomb body (the closer end surface side). In consequence, the porosities of the obtained plugged portions gradually decrease from the center of the honeycomb structure toward the end surface thereof. Consequently, according to the manufacturing method of the present invention, the plugged portions can be prepared by use of one type of plugging material (the plugging material including the pore former having the predetermined particle diameters). Therefore, the burdensome operation of preparing the plurality of types of plugging materials (the plugging materials in which the particle diameters of the pore formers are different) is not required. The plurality of types of plugging materials are the plugging materials including the pore formers whose particle diameters are a plurality of types. Moreover, the burdensome operation of changing the plugging material for filling with respect to each predetermined region is not required. Furthermore, the plugging material is constituted of a single layer (i.e., a plurality of layers formed of the respective plugging materials are not present), and hence the problem that cracks are generated in a boundary between the layers formed of the respective plugging materials does not easily occur.

[2-1] Formed Honeycomb Body Preparing Step:

In the present step, the kneaded material obtained by kneading the forming raw material is extruded into the honeycomb shape to obtain the formed honeycomb body. The open frontal areas of the predetermined cells in one end surface of the obtained formed honeycomb body are plugged, and then fired. In this way, the honeycomb structure part can be prepared.

The forming raw material is preferably obtained by adding a dispersion medium and an additive to the ceramic raw material. Examples of the additive include an organic binder, the pore former and a surfactant. Example of the dispersion medium is water.

The ceramic raw material is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these materials, the cordierite forming raw material is preferable, because the material has a small coefficient of thermal expansion and an excellent resistance to heat shock.

Examples of the organic binder include methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the organic binder is preferably from 0.2 to 8 parts by mass to 100 parts by mass of the ceramic raw material.

There is not any special restriction on the pore former as long as the pore former becomes pores after fired. Examples of the pore former include starch, the resin balloons, a water-absorbing resin, and silica gel. A content of the pore former is preferably from 0.5 to 25 parts by mass to 100 parts by mass of the ceramic raw material.

As the surfactant, ethylene glycol, dextrin, fatty acid soap, polyalcohol or the like can be used. One of these surfactants may be used alone, or two or more of the surfactants may be used as a combination. A content of the surfactant is preferably from 0.1 to 2 parts by mass to 100 parts by mass of the ceramic raw material.

A content of the dispersion medium is preferably from 10 to 100 parts by mass to 100 parts by mass of the ceramic raw material.

When particle diameters and a blending quantity of the ceramic raw material for use (the aggregate particles) and particle diameters and a blending quantity of the pore former to be added are regulated, it is possible to obtain the honeycomb structure part including porous partition walls having desirable porosities and average pore diameter.

There is not any special restriction on a method of kneading the forming raw material to form the kneaded material. An example of the method of kneading the forming raw material to form the kneaded material is a method using, for example, a kneader, a vacuum kneader or the like. The extrusion-forming can be performed by using a die which can have desirable cell shape, partition wall thickness and cell density. As a material of the die, a hard alloy which does not easily wear down is preferable.

[2-2] Plugged Formed Honeycomb Body Preparing Step:

The plugging material for use in the present step includes the forming raw material containing the ceramic raw material, and 1.5 to 35 mass % of resin balloons. When the plugging material is filled into the cells, the plugging material receives the resistance force from the partition walls. This resistance force increases, as the plugging material is filled into the cells. Therefore, the resin balloons included in the plugging material are crushed by the above resistance force and have a decreased volume, as the plugging material is filled into the cells (that is, the resin balloons are popped to be crushed, and hence the volume thereof decrease).

Therefore, a larger amount of the crushed resin balloons (the resin balloons each having the decreased volume) in the plugging material filled into the cells are present in the region on the side of the end surface of the formed honeycomb body (on the side of the closer end surface). In consequence, the porosities of the obtained plugged portions gradually decrease from the center of the honeycomb structure toward the end surface thereof.

An example of the resin balloons is a copolymer of vinylidene chloride, acrylic nitryl or the like.

A content ratio of the resin balloons in the plugging material in terms of a solid content is preferably from 1.5 to 35 mass % as described above, further preferably from 2.0 to 30 mass %, and especially preferably from 2.5 to 25 mass %. When the content ratio of the resin balloons is smaller than 1.5 mass %, there is a tendency that the difference in porosity between the inside and the outside of each of the plugged portions, which is sufficient for dispersing the stress, is not easily made. Moreover, when the content ratio is in excess of 35 mass %, the porosities of the plugged portions might become excessively high, or the pore diameters might excessively increase. In this case, the collecting efficiency might decrease. Furthermore, when the content ratio of the resin balloons is in the above range, the resin balloons hold a water content. Therefore, when the plugging material is rubbed into the honeycomb structure part, generation of "kink" can be prevented.

An average particle diameter of the resin balloons is preferably from 2 to 200 μm, further preferably from 3 to 180 μm, and especially preferably from 4 to 160 μm. When the average particle diameter of the resin balloons is in the above range, pores (the communicating pores) extending through the plugged portions are suitably formed. Therefore, the collecting efficiency can be maintained while suppressing the increase of the pressure loss. When the average particle diameter of the resin balloons is smaller than 2 μm, the number of the communicating pores might decrease. In consequence, the pressure loss might increase. When the average particle diameter is in excess of 200 μm, the number of the communicating pores might increase. In consequence, the collecting efficiency might decrease.

Thicknesses of shell walls of the resin balloons are preferably from 0.01 to 1.00 μm, further preferably from 0.10 to 0.50 μm, and especially preferably from 0.15 to 0.45 μm. When the thicknesses of the shell walls of the resin balloons are smaller than 0.01 μm, the resin balloons might easily be crushed at the rubbing of the plugging material into the honeycomb structure part. Therefore, an effect of the pore formation deteriorates. When the thicknesses are in excess of 1.00 μm, a total weight of the resin balloons increases, and hence the cracks might easily be generated at the firing.

As the forming raw material containing the ceramic raw material and included in the plugging material, it is possible to use the same material as the forming raw material containing the ceramic raw material which is the raw material of the kneaded material to form the formed honeycomb body.

The plugging material may include additives such as water, a binder, a dispersant and a surfactant, in addition to the forming raw material containing the ceramic raw material, and the resin balloons.

An example of a method of continuously rubbing the plugging material into the open frontal areas of the cells to fill the plugging material into the open frontal areas is the following method. For example, first, a mask is attached to one end surface of the formed honeycomb body. Next, holes are made in portions of the mask which close the predetermined cells by known means such as laser. Next, the formed honeycomb body is disposed so that the end surface thereof to which the mask has been attached (the one end surface) faces upward. Next, the plugging material including the forming raw material containing the ceramic raw material and the above resin balloons are continuously rubbed into the upward facing end surface. Specifically, the beforehand prepared plugging material is rubbed into the open frontal areas of the cells as much as a plurality of divided times without adding any new plugging materials. In this way, the above plugging material is filled into one end portion of each of the predetermined cells covered with the mask having the formed holes. Next, a mask is attached to the other end surface of the formed honeycomb body. Next, holes are made in portions of the mask which close the remaining cells, by known means such as laser. Next, the formed honeycomb body is disposed so that the end surface thereof to which the mask has been attached (the other end surface) faces upward. Next, the plugging material is continuously rubbed into the upward facing end surface. Specifically, the beforehand prepared plugging material is rubbed into the open frontal areas of the cells as much as a plurality of divided times without adding any new plugging materials. In this way, the above plugging material is filled into the other end portion of each of the remaining cells covered with the mask having the formed holes. Additionally, the cordierite forming raw material is obtained by blending respective components so as to obtain a theoretical composition of cordierite crystals. The above cordierite forming raw material is specifically a blend of a silica source component, a magnesia source component, an alumina source component and the like. As a method of rubbing the plugging material into the cells of the formed honeycomb body, a conventionally known method can suitably be employed.

A viscosity of the plugging material is preferably from 30 to 2000 dPa·s, further preferably from 40 to 1500 dPa·s, and especially preferably from 50 to 1000 dPa·s. When the viscosity of the plugging material is smaller than the above lower limit value, the plugging material might droop down at the rubbing of the plugging material into the formed honeycomb body. When the viscosity is in excess of the above upper limit value, it might become difficult to rub the plugging material into the formed honeycomb body. In consequence, the depth of each of the plugged portions might not be set to a required depth.

[2-3] Honeycomb Structure Preparing Step:

A firing temperature can suitably be determined in accordance with the material of the formed honeycomb body. When the material of the formed honeycomb body is, for example, cordierite, the firing temperature is preferably from 1380 to 1450° C., and further preferably from 1400 to 1440° C. Moreover, the firing time is preferably from about three to ten hours.

The formed honeycomb body may be dried prior to the firing. There is not any special restriction on a drying method. Examples of the drying method include hot air drying, microwave drying, dielectric drying, reduced-pressure drying, vacuum drying, and freeze-drying. Among these methods, the dielectric drying, the microwave drying or the hot air drying is preferably performed alone, or a combination of the preferable methods is preferably performed. Moreover, drying conditions are preferably a drying temperature of 30 to 150° C. and a drying time of one minute to two hours.

Additionally, after firing the formed honeycomb body to obtain the fired honeycomb body, the plugging material may be filled into the end portions of the predetermined cells on the side of one end surface of the fired honeycomb body.

EXAMPLES

Hereinafter, the present invention will specifically be described with reference to examples, but the present invention is not limited to these examples.

Example 1

As cordierite forming raw materials, alumina, aluminum hydroxide, kaolin, talc and silica were used. To 100 parts by mass of the cordierite forming raw material, 10 parts by mass of pore former, 20 parts by mass of dispersion medium, 1 part by mass of organic binder and 0.5 part by mass of dispersant were added, respectively, mixed and kneaded to prepare a kneaded material. As the dispersion medium, water was used, and as the pore former, cokes having an average particle diameter of 15 μm were used. As the organic binder, hydroxypropyl methylcellulose was used, and as the dispersant, ethylene glycol was used.

Next, the kneaded material was extruded by using a predetermined molding die, to prepare a formed honeycomb body having partition walls with which a plurality of cells extending through the formed honeycomb body from one end surface to the other end surface were formed. In the formed honeycomb body, a cell shape in a cross section orthogonal to an extending direction of the cells was quadrangular, and the whole shape was columnar. Next, the prepared formed honeycomb body was dried with a microwave dryer, and further completely dried with a hot air dryer, to obtain the dried formed honeycomb body (the dried honeycomb body). Afterward, both end portions of the dried honeycomb body were cut into predetermined dimensions. Next, a mask was attached to one end surface of the dried honeycomb body. At this time, all open areas of the cells were closed with the mask. Next, the mask was irradiated with laser to make holes in predetermined portions of the mask (i.e., the portions of the mask which close the predetermined cells).

Next, an end part (the one end part) of this dried honeycomb body to which the mask was attached was directed upward, and a plugging material was continuously rubbed into open frontal areas of the predetermined cells by use of a rubber spatula of an automatic printer. Specifically, the beforehand prepared plugging material was rubbed into open frontal areas of the cells as much as a plurality of divided times without adding any new plugging materials. In this way, the above plugging material was filled into one end portion of each of the predetermined cells. The plugging material was constituted of the same cordierite forming raw material as that of the above kneaded material, 1.5 mass % of resin balloons (a copolymer of acrylic nitryl having an average particle diameter of 50 μm and a shell wall thickness of 0.2 μm) and 30 mass % of water. A viscosity of the plugging material (25° C.) was 280 dPa·s. Additionally, the viscosity of the plugging material was measured with a rotary viscosimeter.

Next, a mask was attached to the other end surface of the dried honeycomb body. At this time, all the open areas of the cells were closed with the mask. Next, the surface was irradiated with the laser to make holes in predetermined portions of the mask (i.e., the portions of the mask which closed the remaining cells).

Next, an end part (the other end part) of this dried honeycomb body to which the mask was attached was directed upward, and the plugging material was continuously rubbed into open frontal areas of the remaining cells by use of the rubber spatula of the automatic printer in the same manner as in the above one end part. Specifically, the beforehand prepared one type of plugging material was rubbed into the open frontal areas of the cells as much as a plurality of divided times without adding any new plugging materials similarly to the above case where the plugging material was filled into the cells on the side of the one end part. In this way, the plugging material was filled into the other end portion of each of the remaining cells.

Additionally, in Table 1, a case where "the plugging material was rubbed into the open frontal areas of the cells" is described as "rubbing". Moreover, a case where "the plugging material was continuously rubbed" is described as "continuous". A case where "a new plugging material was added to the beforehand prepared one type of plugging material, and then this plugging material was rubbed into the open frontal areas of the cells" is described as "discontinuous". Moreover, a case where a method other than the "rubbing" was employed is described as "pressing". The "pressing" indicates a case where the plugging material was filled as follows. That is, first, the plugging material was evenly spread over a flat plate to form a plugging material layer having a flat surface. Afterward, the dried honeycomb body was mounted on the plugging material layer so that the end surface of the dried honeycomb body to which the mask was attached came in contact with the surface of this plugging material layer. Afterward, the dried honeycomb body was pressed onto the plugging material layer. The filling of the plugging material into the open frontal areas of the cells was performed in this manner. Moreover, in Table 1, "the added plugging material" is the plugging material newly added to the beforehand prepared one type of plugging material. "The resin balloons of the added plugging material" indicates a content ratio (mass %) of "the resin balloons" included in the above "added plugging material". "Nil" indicates that any new plugging materials were not added.

Next, the dried honeycomb body into which the above plugging material was filled was dried with a hot air dryer. Afterward, the body was fired at 1410 to 1440° C. for five hours. In this way, a honeycomb structure was prepared.

The obtained honeycomb structure had a diameter of 144 mm, and a length of 152 mm in a central axis direction. A value (L/D) of a ratio of a length L in the central axis direction to a diameter D of the honeycomb structure was 1.06. A cell density of the honeycomb structure was 27.90 cells/cm$^2$. A partition wall thickness was 0.10 mm. Open area ratios of the cells in both the end surfaces of the honeycomb structure were 89.6%, respectively. A partition wall porosity was 36%. An average pore diameter of the partition walls was 10 μm.

Furthermore, a porosity of an outer region of each of plugged portions was 29%. A porosity of a central region of the plugged portion was 34%. A porosity of an inner region of the plugged portion was 38%. A difference in porosity between the inner region of the plugged portion and the outer region thereof was 9%. A difference in porosity between the inner region of the plugged portion and each of the partition walls was 2%. An average pore diameter of the plugged portions was 4 μm. The porosities in the plugged portion were "continuous" (in Table 2, described as "continuity of porosities"). Results are shown in Table 2. A depth of each of the plugged portions (a length thereof in an extending direction of the cells) was 8 mm.

[Porosity]:

The porosities of the partition walls were calculated by the following method. First, a plurality of view fields of the partition walls of the honeycomb structure in a cross section parallel to the cell extending direction were arbitrarily photographed by a scanning type electron microscope (SEM). Next, binarization of each photographed image was performed by the image analysis, and the image was divided into hollow portions (i.e., the pore portions) and portions other than hollows. Next, ratios of the hollow portions in the respective images were calculated, and then an average value of the ratios was obtained. In this way, the porosities of the partition walls were calculated.

Porosities of the respective regions of each of the plugged portions were calculated by the following method. First, a plurality of view fields of the plugged portions in the cross section parallel to the cell extending direction were photographed by the scanning type electron microscope (SEM). Additionally, the view fields to be photographed were selected from both end portions and a central portion of each region in the cell extending direction. Next, the binarization of each photographed image was performed by the image analysis, and the image was divided into the hollow portions (i.e., the pore portions) and the portions other than the hollows. Next, ratios of the hollow portions in the respective images were calculated, and then an average value of the ratios was obtained. In this way, the porosities of the respective regions (the outer region, the central region and the inner region) of the plugged portions were calculated.

[Continuity of Porosities]:

First, each of the plugged portions in the cross section parallel to the cell extending direction was divided into ten regions (the divided regions) in the cell extending direction from the outer end surface to the inner end surface. Next, two view fields of each of the divided regions were photographed by the scanning type electron microscope (SEM). Next, the binarization of each photographed image was performed by the image analysis, and the image was divided into the hollow portions (i.e., the pore portions) and the portions other than the hollows. Next, ratios of the hollow portions in the respective images of the divided regions were calculated, and an average value of the ratios was obtained. In this way, the porosities of the respective divided regions were calculated. Moreover, when the porosities of the respective divided regions increased successively from the outer end surface to the inner end surface, the porosities were "continuous". When the porosities of the respective divided regions did not increase successively from the outer end surface to the inner end surface, the porosities were "discontinuous".

TABLE 1

| | Resin balloon (mass %) | Resin balloon of added plugging material (mass %) | Filling method | | Dia. (mm) | Length (mm) | L/D | Partition wall thickness (mm) | Cell density (cells/cm$^2$) | Cell open area ratio (%) | Partition wall porosity (%) | Average pore dia. of partition walls (μm) |
|---|---|---|---|---|---|---|---|---|---|---|---|---|
| Example 1 | 1.5 | Nil | rubbing | Continuous | 144 | 152 | 1.06 | 0.10 | 27.90 | 89.6 | 36 | 10 |
| Example 18 | 27.5 | Nil | rubbing | Continuous | 144 | 152 | 1.06 | 0.10 | 27.90 | 89.6 | 36 | 10 |
| Example 2 | 6.5 | Nil | rubbing | Continuous | 144 | 152 | 1.06 | 0.10 | 27.90 | 89.6 | 36 | 10 |
| Example 3 | 4.0 | Nil | rubbing | Continuous | 144 | 152 | 1.06 | 0.15 | 34.10 | 83.0 | 40 | 12 |
| Example 19 | 27.5 | Nil | rubbing | Continuous | 144 | 152 | 1.06 | 0.15 | 34.10 | 83.0 | 40 | 12 |
| Example 20 | 25.0 | Nil | rubbing | Continuous | 144 | 152 | 1.06 | 0.15 | 34.10 | 83.0 | 40 | 12 |
| Example 4 | 15.0 | Nil | rubbing | Continuous | 144 | 152 | 1.06 | 0.15 | 34.10 | 83.0 | 40 | 12 |
| Example 5 | 6.5 | Nil | rubbing | Continuous | 144 | 152 | 1.06 | 0.15 | 34.10 | 83.0 | 40 | 12 |
| Example 6 | 3.0 | Nil | rubbing | Continuous | 144 | 152 | 1.06 | 0.15 | 34.10 | 83.0 | 40 | 12 |
| Example 7 | 10.0 | Nil | rubbing | Continuous | 144 | 152 | 1.06 | 0.25 | 46.50 | 68.4 | 52 | 15 |
| Example 8 | 25.0 | Nil | rubbing | Continuous | 144 | 152 | 1.06 | 0.25 | 46.50 | 68.4 | 52 | 15 |
| Example 9 | 7.5 | Nil | rubbing | Continuous | 144 | 152 | 1.06 | 0.25 | 46.50 | 68.4 | 52 | 15 |
| Example 10 | 35.0 | Nil | rubbing | Continuous | 144 | 152 | 1.06 | 0.30 | 46.50 | 62.8 | 52 | 15 |
| Example 11 | 5.5 | Nil | rubbing | Continuous | 144 | 152 | 1.06 | 0.30 | 46.50 | 62.8 | 58 | 18 |
| Example 12 | 20.0 | Nil | rubbing | Continuous | 144 | 152 | 1.06 | 0.30 | 46.50 | 62.8 | 58 | 18 |
| Example 13 | 10.0 | Nil | rubbing | Continuous | 144 | 152 | 1.06 | 0.30 | 46.50 | 62.8 | 65 | 20 |
| Example 14 | 20.0 | Nil | rubbing | Continuous | 144 | 152 | 1.06 | 0.30 | 46.50 | 62.8 | 65 | 20 |
| Example 15 | 15.0 | Nil | rubbing | Continuous | 144 | 152 | 1.06 | 0.40 | 46.50 | 52.3 | 70 | 22 |
| Example 16 | 30.0 | Nil | rubbing | Continuous | 144 | 152 | 1.06 | 0.40 | 46.50 | 52.3 | 70 | 22 |
| Example 17 | 30.0 | Nil | rubbing | Continuous | 144 | 152 | 1.06 | 0.75 | 34.10 | 30.8 | 70 | 22 |
| Example 21 | 30.0 | Nil | rubbing | Continuous | 144 | 152 | 1.06 | 0.10 | 27.90 | 89.6 | 36 | 10 |
| Example 22 | 27.5 | Nil | rubbing | Continuous | 144 | 152 | 1.06 | 0.10 | 27.90 | 89.6 | 36 | 10 |
| Comparative Example 1 | 1.0 | Nil | Pressing | Continuous | 144 | 152 | 1.06 | 0.10 | 27.90 | 89.6 | 36 | 10 |
| Comparative Example 2 | 3.5 | Nil | Pressing | Continuous | 144 | 152 | 1.06 | 0.15 | 34.10 | 83.0 | 40 | 12 |
| Comparative Example 3 | 5.5 | 10.0 | rubbing | Discontinuous | 144 | 152 | 1.06 | 0.25 | 46.50 | 68.4 | 52 | 15 |
| Comparative Example 4 | 10.0 | 20.0 | rubbing | Discontinuous | 144 | 152 | 1.06 | 0.30 | 46.50 | 62.8 | 65 | 20 |
| Comparative Example 5 | 2.5 | 4.0 | rubbing | Discontinuous | 144 | 152 | 1.06 | 0.15 | 34.10 | 83.0 | 40 | 12 |
| Comparative Example 6 | 0.0 | Nil | Pressing | Continuous | 144 | 152 | 1.06 | 0.10 | 27.90 | 89.6 | 36 | 10 |
| Comparative Example 7 | 2.5 | 5.0 | rubbing | Discontinuous | 144 | 152 | 1.06 | 0.10 | 27.90 | 89.6 | 36 | 10 |
| Comparative Example 8 | 3.5 | 7.0 | rubbing | Discontinuous | 144 | 152 | 1.06 | 0.15 | 34.10 | 83.0 | 40 | 12 |
| Comparative Example 9 | 3.0 | 8.0 | rubbing | Discontinuous | 144 | 152 | 1.06 | 0.15 | 34.10 | 83.0 | 40 | 12 |
| Comparative Example 10 | 4.0 | 12.0 | rubbing | Discontinuous | 144 | 152 | 1.06 | 0.25 | 46.50 | 68.4 | 52 | 15 |

TABLE 2

| | Porosity of outer region (%) | Porosity of central region (%) | Porosity of inner region (%) | Difference in porosity between inner region and outer region (%) | Difference in porosity between inner region and partition wall (%) | Average pore dia. of plugged portions (μm) | Continuity of porosities |
|---|---|---|---|---|---|---|---|
| Example 1 | 29 | 34 | 38 | 9 | 2 | 4 | Continuous |
| Example 18 | 31 | 52 | 81 | 50 | 45 | 36 | Continuous |
| Example 2 | 32 | 50 | 64 | 32 | 28 | 25 | Continuous |
| Example 3 | 34 | 40 | 51 | 17 | 11 | 20 | Continuous |
| Example 19 | 35 | 54 | 80 | 45 | 40 | 35 | Continuous |
| Example 20 | 35 | 52 | 75 | 40 | 35 | 35 | Continuous |
| Example 4 | 37 | 61 | 78 | 41 | 38 | 34 | Continuous |
| Example 5 | 42 | 55 | 63 | 21 | 23 | 21 | Continuous |
| Example 6 | 44 | 46 | 48 | 4 | 8 | 18 | Continuous |
| Example 7 | 49 | 59 | 73 | 24 | 21 | 32 | Continuous |
| Example 8 | 52 | 69 | 86 | 34 | 34 | 53 | Continuous |
| Example 9 | 53 | 62 | 68 | 15 | 16 | 31 | Continuous |
| Example 10 | 80 | 85 | 88 | 8 | 36 | 73 | Continuous |
| Example 11 | 59 | 60 | 61 | 2 | 3 | 43 | Continuous |
| Example 12 | 60 | 68 | 80 | 20 | 22 | 48 | Continuous |
| Example 13 | 65 | 71 | 73 | 8 | 8 | 41 | Continuous |
| Example 14 | 69 | 75 | 80 | 11 | 15 | 53 | Continuous |
| Example 15 | 72 | 74 | 76 | 4 | 6 | 58 | Continuous |
| Example 16 | 79 | 84 | 87 | 8 | 17 | 70 | Continuous |
| Example 17 | 80 | 82 | 86 | 6 | 16 | 63 | Continuous |
| Example 21 | 31 | 55 | 86 | 55 | 50 | 38 | Continuous |
| Example 22 | 36 | 54 | 81 | 45 | 45 | 36 | Continuous |
| Comparative Example 1 | 38 | 38 | 38 | 0 | 2 | 8 | Discontinuous |
| Comparative Example 2 | 52 | 52 | 52 | 0 | 12 | 21 | Discontinuous |
| Comparative Example 3 | 73 | 65 | 60 | −13 | 8 | 52 | Discontinuous |
| Comparative Example 4 | 78 | 73 | 70 | −8 | 5 | 62 | Discontinuous |
| Comparative Example 5 | 40 | 38 | 36 | −4 | −4 | 12 | Discontinuous |
| Comparative Example 6 | 32 | 32 | 32 | 0 | −4 | 3 | Discontinuous |
| Comparative Example 7 | 52 | 46 | 36 | −16 | 0 | 14 | Discontinuous |
| Comparative Example 8 | 60 | 56 | 48 | −12 | 8 | 31 | Discontinuous |
| Comparative Example 9 | 66 | 55 | 42 | −24 | 2 | 28 | Discontinuous |
| Comparative Example 10 | 76 | 68 | 54 | −22 | 2 | 45 | Discontinuous |

As to the prepared honeycomb structures, evaluations of [end surface compressive strength], [four-point bend], [the number of cracked structure at canning] and [resistance to heat shock] and [general evaluation] were performed, respectively. Hereinafter, evaluation methods of the respective evaluations will be described.

[End Surface Compressive Strength]

The prepared honeycomb structure was loaded with a hydrostatic pressure load, and there was measured the load (the compressive breakdown strength) at a time when the honeycomb structure was broken. Measured values were evaluated on the basis of the following references. A case where a pressure value at a time when the honeycomb structure was broken was 1.0 MPa or more was "passable". A case where a pressure value at a time when the honeycomb structure was broken was smaller than 1.0 MPa was "rejectable".

[Four-Point Bend]

A test piece including the plugged portion was cut out of the prepared honeycomb structure. Each cut test piece had a quadrangular cylindrical-like shape having one side of 10 mm and a length of 30 mm. A four-point strength (MPa) of this test piece was measured. Afterward, this measured value was evaluated on the basis of the following references. A case where the four-point strength was 1.0 MPa or more was "passable". A case where the four-point strength was smaller than 1.0 MPa was "rejectable".

[Number of Cracked Structures at Canning]

Five honeycomb structures were contained in can members, respectively. Immediately after the canning, each of the honeycomb structures was removed from the can member. Afterward, these honeycomb structures were observed, and the number of the honeycomb structures in which cracks were generated was counted. Afterward, evaluation was performed on the basis of the following references. A case where any cracks were not generated in any one of the five honeycomb structures was "passable". A case where the cracks were confirmed even in one of the five honeycomb structures was "rejectable". Additionally, all the five honeycomb structures had the same size. The can member each having an inner diameter of 152 mm and a length of 160 mm was used.

[Resistance to Heat Shock]

Each of the five honeycomb structures was disposed in an electric furnace, raised to 750° C. and held for one hour. Immediately after the holding, the honeycomb structure was removed from the electric furnace, and naturally cooled in the atmosphere. Afterward, the number of the honeycomb structures in which the cracks were generated was counted.

Afterward, evaluation was performed on the basis of the following references. A case where any cracks were not generated in any one of the five honeycomb structures was "passable". A case where the cracks were confirmed even in one of the five honeycomb structures was "rejectable". Results are shown in the column of "No. of cracked structures at heat shock resistance test".

[General Evaluation]

A case where any cracks were not generated in any one of the evaluations of [Number of Cracked Structures at Canning] and [Resistance to Heat Shock] (i.e., the case where each of the evaluations was "passable") was "OK". A case where the honeycomb structure in which the cracks were generated was confirmed (i.e., the case where one of the evaluations was "rejectable") was "NG".

Results of the respective evaluations in the present example are shown in Table 3.

TABLE 3

| | Compressive breakdown strength | | 4-point bend | | No. of cracked structures at canning | No. of cracked structures at heat shock test | General evaluation |
|---|---|---|---|---|---|---|---|
| | (Mpa) | Evaluation | (Mpa) | Evaluation | (No.) | (No.) | |
| Example 1 | 2.3 | Passable | 1.2 | Passable | 0 | 0 | OK |
| Example 18 | 3.3 | Passable | 1.1 | Passable | 0 | 0 | OK |
| Example 2 | 3.1 | Passable | 1.9 | Passable | 0 | 0 | OK |
| Example 3 | 2.8 | Passable | 1.5 | Passable | 0 | 0 | OK |
| Example 19 | 3.1 | Passable | 1.3 | Passable | 0 | 0 | OK |
| Example 20 | 3.1 | Passable | 1.5 | Passable | 0 | 0 | OK |
| Example 4 | 3.5 | Passable | 2.0 | Passable | 0 | 0 | OK |
| Example 5 | 3.1 | Passable | 2.5 | Passable | 0 | 0 | OK |
| Example 6 | 1.8 | Passable | 1.3 | Passable | 0 | 0 | OK |
| Example 7 | 3.5 | Passable | 2.5 | Passable | 0 | 0 | OK |
| Example 8 | 3.6 | Passable | 2.7 | Passable | 0 | 0 | OK |
| Example 9 | 2.8 | Passable | 2.1 | Passable | 0 | 0 | OK |
| Example 10 | 1.4 | Passable | 3.1 | Passable | 0 | 0 | OK |
| Example 11 | 1.6 | Passable | 1.6 | Passable | 0 | 0 | OK |
| Example 12 | 3.1 | Passable | 2.8 | Passable | 0 | 0 | OK |
| Example 13 | 2.1 | Passable | 2.7 | Passable | 0 | 0 | OK |
| Example 14 | 2.5 | Passable | 2.9 | Passable | 0 | 0 | OK |
| Example 15 | 1.2 | Passable | 2.6 | Passable | 0 | 0 | OK |
| Example 16 | 1.5 | Passable | 3.0 | Passable | 0 | 0 | OK |
| Example 17 | 2.5 | Passable | 3.9 | Passable | 0 | 0 | OK |
| Example 21 | 3.4 | Passable | 1.0 | Passable | 0 | 0 | OK |
| Example 22 | 3.4 | Passable | 1.1 | Passable | 0 | 0 | OK |
| Comparative Example 1 | 1.4 | Passable | 0.9 | Rejectable | 0 | 1 | NG |
| Comparative Example 2 | 0.9 | Rejectable | 1.1 | Passable | 1 | 0 | NG |
| Comparative Example 3 | 0.7 | Rejectable | 1.1 | Passable | 4 | 0 | NG |
| Comparative Example 4 | 0.9 | Rejectable | 1.4 | Passable | 2 | 0 | NG |
| Comparative Example 5 | 1.4 | Passable | 0.6 | Rejectable | 0 | 5 | NG |
| Comparative Example 6 | 1.1 | Passable | 0.8 | Rejectable | 0 | 4 | NG |
| Comparative Example 7 | 0.5 | Rejectable | 0.7 | Rejectable | 5 | 5 | NG |
| Comparative Example 8 | 0.7 | Rejectable | 0.9 | Rejectable | 4 | 3 | NG |
| Comparative Example 9 | 0.3 | Rejectable | 0.7 | Rejectable | 5 | 5 | NG |
| Comparative Example 10 | 0.4 | Rejectable | 0.8 | Rejectable | 5 | 4 | NG |

Examples 2 to 22 and Comparative Examples 1 to 10

Honeycomb structures of Examples 2 to 22 and Comparative Examples 1 to 10 were prepared similarly to Example 1, except that amounts of resin balloons shown in Table 1 were used, and honeycomb structures satisfying conditions shown in Tables 1 and 2 were used. Afterward, the respective prepared honeycomb structures were subjected to the above evaluations similarly to Example 1. Results are shown in Table 3.

As apparent from Table 3, it was possible to confirm that in the honeycomb structures of Examples 1 to 22, cracks were not easily generated at canning and during use, as compared with the honeycomb structures of Comparative Examples 1 to 10.

A honeycomb structure of the present invention can suitably be used for purification of an exhaust gas. By a manufacturing method of the honeycomb structure of the present invention, it is possible to manufacture the honeycomb structure which can suitably be used for the purification of the exhaust gas.

DESCRIPTION OF REFERENCE MARKS

2: one end surface, 3: the other end surface, 4: cell, 4a: predetermined cell, 4b: remaining cell, 5: partition wall, 6: honeycomb structure part, 7: outer peripheral wall, 8: plugged portion, 11: outer end surface, 13: inner end surface, 15: outer region, 17: inner region, 19: central region, 100: honeycomb structure, D: distance between outer end surface and inner end surface, K1: inner boundary line, K2: outer boundary line, and T1 and T2: end point.

What is claimed is:

1. A manufacturing method of a honeycomb structure comprising:
a formed honeycomb body preparing step of extruding, into a honeycomb shape, a kneaded material obtained by kneading a forming raw material containing a ceramic raw material, to prepare a formed honeycomb body having partition walls with which there are formed a plurality of cells extending through the formed honeycomb body from one end surface to the other end surface;
a plugged formed honeycomb body preparing step of continuously rubbing, into open frontal areas of the cells of the prepared formed honeycomb body, a plugging material including the forming raw material containing the ceramic raw material and 1.5 to 35 mass % of resin balloons, to fill the plugging material into the open frontal areas, thereby preparing the plugged formed honeycomb body; and
a honeycomb structure preparing step of firing the prepared plugged formed honeycomb body, to prepare the honeycomb structure in which porous plugged portions are arranged in one end portion of each of the predetermined cells and the other end portion of each of the remaining cells.

2. The manufacturing method of the honeycomb structure according to claim 1,
wherein a viscosity of the plugging material is from 30 to 2000 dPa·s.

* * * * *